Dec. 1, 1959

M. TELKES 2,915,397

COOKING DEVICE AND METHOD

Filed Sept. 30, 1957

INVENTOR
Maria Telkes
BY
Kenyon + Kenyon
ATTORNEY

Dec. 1, 1959  M. TELKES  2,915,397
COOKING DEVICE AND METHOD
Filed Sept. 30, 1957  2 Sheets-Sheet 2

INVENTOR
Maria Telkes
BY
Kenyon & Kenyon
ATTORNEY

United States Patent Office 2,915,397
Patented Dec. 1, 1959

2,915,397

COOKING DEVICE AND METHOD

Maria Telkes, New York, N.Y.

Application September 30, 1957, Serial No. 687,059

16 Claims. (Cl. 99—1)

This invention relates to cooking devices and methods and relates more particularly to cooking of the type wherein an article comprising material to be cooked is brought to cooking temperature by directly contacting it with a surface heated to a cooking temperature or above.

When in conventional cooking of the type referred to an article comprising material to be cooked is placed in direct contact with a preheated platen or the like there is immediate heat exchange whereby the platen becomes very substantially cooled in those areas where it is in contact with the material, whether the article as initially placed on the platen is at room temperature or at a substantially lower refrigerated temperature. The result is that there is a substantial interval of time before the platen again can be brought up to cooking temperature. This interval of time is disadvantageous not merely from the point of view of the amount of time consumed, especially in a commercial operation where it is desirable to accomplish the cooking of each item as promptly and efficiently as possible. A more serious difficulty, however, results from the fact that during the warming up period for both the platen and the raw material, there is an opportunity for the escape of moisture in the form of juices and vapor with resultant shrinkage as well as flavor loss. In the case of meats, fish, poultry and the like, such shrinkage usually is of the order of 25% to 35% of the weight of the raw material. This loss in weight represents a serious lessening in sale value when the article in question is sold on the basis of the weight of the cooked material. Moreover, the drying out of the food impairs its palatability and flavor, as well as its nutrient value.

Other disadvantages of conventional cooking devices and methods of the type in question result from the difficulties encountered in controlling the temperature of the platen or platens on which the food is to be cooked. As aforesaid, the direct contact with the food causes local cooling of certain portions of the platen and this makes it difficult to control the temperature of the platen as a whole even with the use of a thermostat inasmuch as other portions of the platen which are not in contact with the article to be cooked may become heated excessively. On the other hand, if the other portions are prevented from becoming heated excessively, then the portion of the platen in contact with the article to be cooked may require an excessively long time in being brought up to cooking temperature or may fail to fully attain the desired cooking temperature. In order to compensate for the heat dissipated into the material to be cooked when it is placed in contact with a platen or the like, it is general practice to supply heat at a rate which is such as to cause build-up of heat to an excessively high platen temperature in the platen zones somewhat spaced from area of direct contact with the material to be cooked, with the result that there is a tendency for the platen to locally overheat in the zones referred to to a temperature at which there is charring of materials such as fats or starches which may become separated from the main body of the material to be cooked. Such overheating is objectionable for a number of reasons. The charred material is extremely difficult to clean off without considerable scouring. There also is the danger of having a burned flavor communicated to the material to be cooked. Moreover, if the charring is too severe, objectionable smoke and fumes are produced.

It is an object of this invention to provide an improved cooking device and method whereby difficulties of the character aforesaid may be minimized or eliminated entirely. Thus more particular objects of this invention are to reduce the amount of time required for effective cooking of raw materials and to provide a cooking device and method whereby loss of weight of raw material during cooking is greatly reduced as compared with conventional practice.

Other objects of this invention relate to more efficient use of heat and to providing greatly improved control with respect to platen temperatures. This control relates both to the uniformity of the temperature of the platen throughout its surface area and to the maintenance of a temperature close to cooking temperature at all times so that the platen does not become cooled excessively upon contact with a cold raw material and alternatively does not become heated excessively so as to give rise to either scorching of the materials being cooked or charring of portions of the platen surface.

Features of this invention relate to the provision of a platen or other sheet-like body presenting a cooking surface on one side thereof for direct contact with the surface of an article comprising material to be cooked. On the surface of the platen opposed to the cooking surface there is disposed a mass essentially comprising anhydrous sodium sulphate, the mass being in direct heat exchange relationship with the platen. Pure anhydrous sodium sulphate occurs in rhombic crystal form at temperatures below 460° F. but substantially at this temperature, upon being subjected to input of heat energy, becomes transformed to another crystal form, namely, the hexagonal form, and the conversion or transition from the one crystal form to the other requires a considerable amount of heat per pound of anhydrous sodium sulphate to effect the conversion. This amount of latent heat absorbed per pound is to be contrasted with the specific heat of about 0.1 to 0.3 B.t.u. per pound that is derivable from the sensible heat of most materials per degree Fahrenheit of temperature difference. After the conversion of the anhydrous sodium sulphate has been completed, the temperature of the anhydrous sodium sulphate may be raised still further but inasmuch as the melting point of this substance is very high, such further heating may be effected without affecting the solidity of a mass of the anhydrous sodium sulphate material.

After a mass of anhydrous sodium sulphate has been brought to a temperature above 460° F. reconversion to the original crystal form upon cooling releases the stored up heat.

According to this invention, when a material such as meat or fish is placed on a platen, the opposite side of which is in direct contact with a mass of anhydrous sodium sulphate at a temperature somewhat above 460° F., it has been found that there is virtually no, or only slight, cooling of the platen due to the extraordinarily great rate at which the stored up heat energy is released and transmitted to the platen. The heat energy which is thus released, is released at a rate very much faster than is possible using ordinary heating means such as an electrical heating element, for example. Moreover, the heat release is much more uniform in that it is effective wherever the heat energy is required instead of being supplied uniformly to all portions of the platen as a whole. As a result, the surface of the meat, fish or the like is immediately seared, and because of the searing of the surface as well as the much more rapid heating which is accomplished, a food material can be heated to cooking temperature and cooked with attendant weight loss and shrinkage that is very greatly reduced as compared with conventional cooking practice.

Because the desired cooking temperature for the platen can be maintained even though the platen temperature, prior to placing thereon an article comprising material to be cooked, may be only a few degrees above the temperature to be maintained, excessive platen temperatures are avoided before, during and after the cooking of a particular article and the aforesaid difficulties such as charring, burning, smoking and the like may be eliminated altogether.

Further features of this invention relate to the provision of the material to be cooked in slab-like form and causing it to be disposed between two platens, each of which is backed with a mass of anhydrous sodium sulphate. In this way, the utility and advantages which are made possible by utilizing anhydrous sodium sulphate are realized still more effectively in obtaining rapid cooking and in minimization of shrinking and loss of weght.

Further features of this invention relate to the disposition of the material to be cooked in a substantially closed container composed substantially of impervious material which, however, is readily conductive of heat. If a material to be cooked is thus confined and is subjected to cooking in direct contact with a platen backed with anhydrous sodium sulphate, and preferably between such platens, shrinking and weight loss may be reduced so as to be negligible and the nutritive value of the food may be enhanced still further. Moreover, when the wall of the container is composed of flexible material, a member may be provided which is actuated in response to the movement of the wall which occurs when the pressure of the vapor within the container increases sufficiently to produce such movement. Generally this occurs when the temperature has risen throughout the mass to be cooked sufficiently to accomplish the desired amount of cooking, and the movement of the member may be availed of for timing the removal of the food from conductive heat exchange relation with the platen.

This invention may be practiced in connection with the cooking of any material to be cooked or body or article comprising such material by bringing it into contact with a heating platen or the like. Thus this invention may be practiced in the cooking of all meats, poultry and fish and likewise vegetables and other food products including liquid or semi-liquid bodies or materials, e.g. a batter or a soup.

For purposes of illustration, this invention will be described in connection with the cooking of a material such as meat. The raw meat is sliced into convenient serving portions and the inedible parts such as bone, fats and the like, preferably are removed. The thickness of the portions is that which is conventional in the case of the particular meat that is to be cooked and may range typically from about ¼ inch to 1 inch or even more. The weight of the portions may be adjusted as desired and for commercial cooking this will depend on the merchandising practice for the meat in question. The fact that the inedible portions of the meat are removed increases the value of the product in the case of commercial cooking, and the weight loss resulting from their removal is more than compensated for by the lessened amount of shrinking that can be realized in the practice of this invention.

The meat may be cooked without further additives or the usual additives may be applied thereto such as seasoning and, if desired, further additives may be present, e.g. for coating the meat with cooking oil, milk, flour, breadcrumbs, etc. Moreover, sauces, gravies and other food materials may be disposed along with the meat, either intermingled therewith or adjacent thereto, as is common practice in the case of precooked combinations of meat and vegetables.

The food portion comprising meat having been arranged in slab-like form can then be encased in a suitable impervious container which preferably is in the form of a thin walled metal aluminum bag that may be of the type widely used for packaging food. The encased material to be cooked may then be flattened out to remove excess air and the container may be closed by heat sealing or crimping so that it may be throughout impervious to air and moisture. Each portion may be in the form of an individual package, as described above, or for a commercial operation a plurality of packages may be linked together in a continuous band so as to facilitate their handling during the cooking operation and during subsequent cooling and packing.

The meat comprised in the material to be cooked having been encased as above described is now ready to be placed in the cooking device which embodies and utilizes this invention. One type of such cooking device has been shown for purposes of illustration in the accompanying drawings wherein.

In the cooking device shown there are two platens 10 and 10a, each of which presents a cooking surface for direct contact with an article comprising material to be cooked. When the article is of the character hereinabove referred to it comprises the slices 11 of meat arranged in a flat, slab-like mass which is encased in aluminum foil 12. The package containing the meat to be cooked is shown between the platens 10 and 10a which are in direct contact with the opposite surfaces thereof so that the platen heat is conducted through the aluminum foil 12 to the meat slices 11.

The platens 10 and 10a may be composed of any suitable heat conductive material that is resistant to cooking temperatures, a metal such as stainless steel or aluminum preferably being employed.

Figure 2:
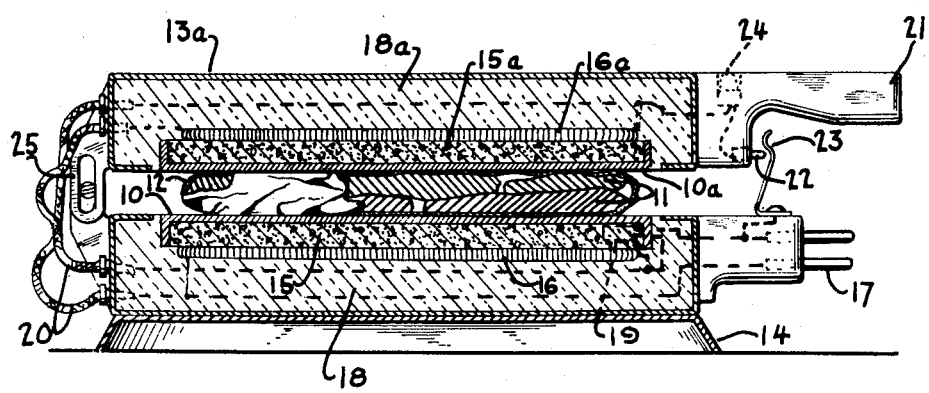
Fig. 2 is a sectional elevation taken on the line 2—2 of Fig. 1.

The lower platen 10 is mounted on the base 14. Immediately in back of the platen 10 and in contact therewith there is disposed a mass 15 essentially comprising anhydrous sodium sulphate. Preferably the mass 15 is distributed substantially uniformly throughout the extent of the effective cooking area of the platen 10. The thickness of the mass may be selected according to the amount of the demand for heat release for which the device is designed. Usually about ¼ to ½ inch is suitable. For heating the mass 15 of anhydrous sodium sulphate, any suitable heating means may be used such as the electrical heating element 16 that is connected to the plug terminals 17 as schematically indicated in Fig. 2 for connection to a conventional source of electric current. While the electrical heating element 16 has been shown disposed in back of the mass 15, it alternatively may be wholly or partially embedded in the mass. The region on the side of the mass remote from the panel 10 preferably is packed with a suitable heat insulation material 18 such as rock wool or glass wool. In order to limit the temperature to which the platen 10 may be heated, any suitable means may be employed such as a conventional thermostat 19 which is adapted to disconnect the supply of electrical current to the heating element 16 whenever the temperature of the platen 10 rises above a predetermined temperature.

The upper platen 10a is provided in substantially the same manner as the lower platen 10. Thus the platen 10a is backed by the mass 15a of anhydrous sulphate which is heated by the electric heating coil 16a and which is backed by the heat insulating material 18a within the casing 13a. Preferably the upper platen is joined to the lower platen by the sliding hinges 25 which accommodate the disposition of the platens in contact with the surfaces of the article placed between the platens notwithstanding differences in thickness as between different articles that may be placed between the platens. The electrical connections for heating the lower platen may be extended by the wires 20 to the upper platen. In the embodiment shown the thermostat 19 governs both platens. However, if desired, a separate thermostat could be employed for each platen.

In using the device exemplified in the drawings, the device preferably is preheated until it has reached its maximum operating temperature, which temperature, as above mentioned, is substantially above the conversion temperature of the anhydrous sodium sulphate in the masses 15 and 15a, but is below the melting point of the anhydrous sodium sulphate material. Preferably, the temperature is not permitted to rise above about 500° or 550° F. After the device has thus been preheated, the packaged material to be cooked, such as sliced meat, or a succession of such packages in the case of a commercial operation, is inserted between the two platens, the top platen exerting some pressure so as to maintain the surfaces of the package in intimate contact with each of the platens. The package when thus introduced into the device may be at room temperature or at some lower temperature, and the contact of the package surfaces with the platens 10 and 10a causes them to be cooled in the areas of direct contact to the conversion temperature of the anhydrous sodium sulphate comprised in the masses 15 and 15a. However, as soon as such areas of the platens 10 and 10a are cooled to the conversion temperature of the anhydrous sodium sulphate comprised in the masses 15 and 15a, this immediately sets up the reconversion of the anhydrous sodium sulphate from the hexagonal to the rhombic form to the extent required for maintaining the temperature at the conversion temperature of the anhydrous sodium sulphate, and the platens 10 and 10a remain substantially at the conversion temperature notwithstanding the heavy drain of heat therefrom where the platen surfaces are in contact with the cold raw material. Because of the high platen temperature that is maintained, the outer surface of the meat or other material within the package is "seared" almost immediately, producing the desired color and texture. Moreover, notwithstanding the rapidity of the flow of heat from the masses 15 and 15a through the platens of the material to be cooked while the material is being warmed to cooking temperature, the reserve of energy provided by the masses 15 and 15a is more than adequate to meet the demand for heat even though the demand for heat is very much greater than the capacity for supplying heat of the heating elements 16 and 16a. When the cooking temperature is reached or approached, then the demand for additional heat is reduced and usually becomes less than that supplied by the heating elements 16 and 16a, with the result that the reconversion of the sulphate stops before the cooking period is completed and that portion of the sulphate which has gone over to the rhombic form to liberate the stored heat starts going back to the hexagonal form with absorption of heat even before the cooking period is finished, with the result that the masses 15 and 15a may be brought substantially into readiness for the next succeeding article to be cooked. Another result is that regardless of the capacity of the heating elements 16 and 16a to supply heat, the temperature of the masses 15 and 15a remains substantially at the conversion temperature until nearly all of the anhydrous sodium sulphate has absorbed sufficient heat to cause it to occur in the hexagonal form. After such conversion has been completed, then the temperature will continue to rise above conversion temperature, but, because of the heat-liberating capacity of the masses 15 and 15a, it is not necessary to carry the temperature of the platens 10 and 10a to a temperature that is more than moderately higher than the conversion temperature before thermostatically discontinuing the supply of energy to the heating elements 16 and 16a. For this reason, scorching, carbonization, and possible burning due to overheating of the platens may be avoided and the more efficient utilization of the heat energy results in substantial economies.

While the article comprising the material to be cooked is in contact with the platens 10 and 10a which are maintained substantially at the conversion temperature of the masses 15 and 15a of anhydrous sodium sulphate, the material to be cooked, such as meat, is quickly brought to cooking temperature, and moisture in the material is vaporized with the generation of steam which likewise has a cooking and sterilizing effect. In conventional meat preparation, the interior temperature of meats seldom exceeds 160° to 200° F. In the practice of this invention, on the other hand, it is possible to obtain temperatures at or above the boiling point of water very quickly throughout the entire mass of the packaged material between the platens.

Figure 1:
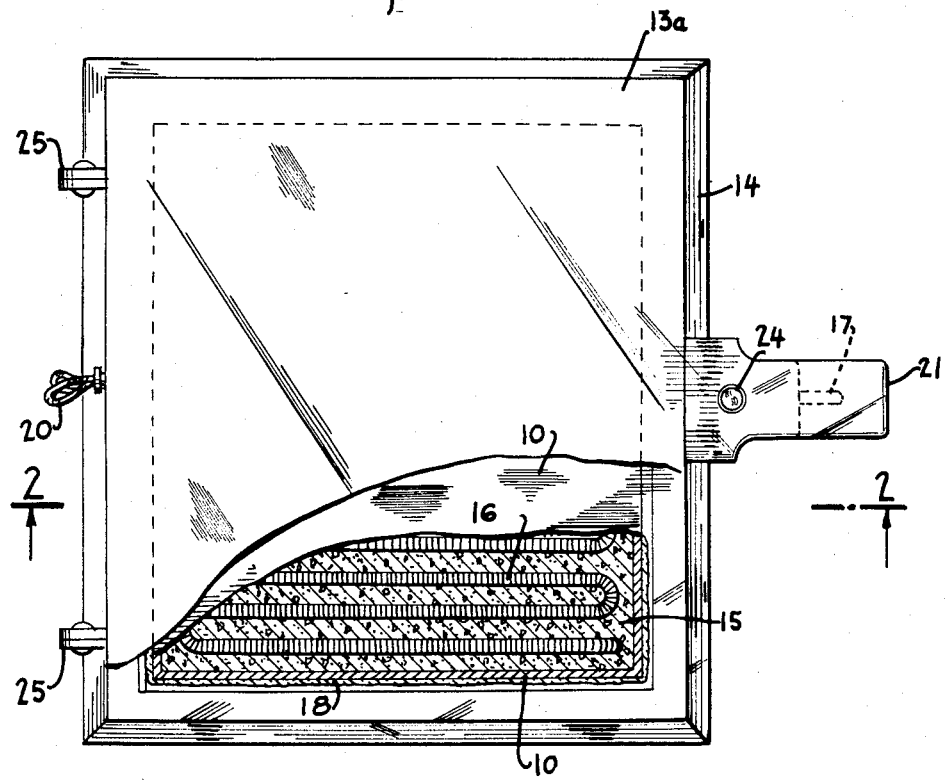
Fig. 1 is a plan view of the device with a portion broken away to show the inner structure.

As soon as the boiling point of water is reached, the steam which is generated tends to expand the flexible walls of the package and, since the package is sealed and does not permit the steam to escape, the confined steam causes the package to bulge. Such bulging results in a lifting of the top platen which may be observed by the operator who in such case may lift the upper platen, utilizing the handle 21 for the purpose, so as to remove the package containing the cooked food. If desired, the movement of a member such as the top platen may result in other effects such as the actuation of a signal, as indicated schematically in Fig. 1. Thus, the lifting of the upper platen 10a results in the contact point 22 coming into contact with the flexible contact member 23 to complete a circuit through a signal light 24. Alternatively, other signal devices may be used, or, in the case of a commercial operation, movement caused by the swelling of the package within the cooking device may set in motion automatic means for removing the packaged cooked material and placing another package of material to be cooked in the device.

By the practice of this invention as above described, a cooked product is obtainable with only a negligible shrinkage loss and with no burning or scorching. Moreover, there is great uniformity of the product and economy both in time and amount of heat energy required.

By the practice of this invention as above exemplified, various meats have been cooked with the advantageous results indicated in the following table:

| Type of product | Thickness, inch | Cooking time, minutes | Weight loss, percent |
| --- | --- | --- | --- |
| Veal, leg, sliced nothing added | ¼ | 2 | 1.8 |
| Veal, leg, sliced, coated with flour | ¼ | 2 | 0.6 |
| Veal, leg, sliced, breaded | ⅜ | 3 | 1.3 |
| Beef, round steak, floured | ⅜ | 2 | 2.1 |
| Pork chops, breaded | ⅜ | 2.5 | 2.1–4.9 |
| Codfish, breaded | ⅝ | 4.5 | 3.9–4.8 |
| Hamburg | ½ | 1.5 | 3.0 |

In the foregoing table, the cooking times noted are only a small fraction of times conventionally required for roasting or broiling and the weight loss likewise is very much less than that which occurs when conventional cooking methods are employed.

The aforesaid conversion temperature of 460° F. is for substantially pure anhydrous sodium sulphate. As mentioned in my copending application, Serial No. 283,667, for Method and Apparatus for Storing and Releasing Heat, filed April 22, 1952, now Patent No. 2,808,494, issued on October 1, 1957, there are substances which have the effect of altering the conversion temperature of anhydrous sodium sulphate. Preferred substances having this effect are lithium sulphate, potassium sulphate and calcium sulphate. The effects of these materials in small amounts on the conversion temperature of anhydrous sodium sulphate are dealt with more fully in my aforesaid application. For example, five percent of lithium sulphate lowers the conversion temperature of anhydrous sodium sulphate to 414° F., five percent of calcium sulphate lowers the conversion temperature to 370° F., and four percent of calcium sulphate lowers the conversion temperature to 350° F. By selection of the kind and amount of added salt, the conversion temperature may be caused to be that temperature which is best suited for the particular cooking operation to be carried out. Whether such added substances are present or not, the mass is referred to herein and in the claims as essentially comprising anhydrous sodium sulphate. Similarly, other materials may be present such as fillers either in particulate or fibrous condition, and, as mentioned in my aforesaid application, heat conductivity into and from a mass essentially comprising anhydrous sodium sulphate may be facilitated by inclusion in the mass of a heat-conductive material in fibrous form such as steel wool. In such case, also, the heat-absorbing mass is referred to herein and in the claims as essentially comprising anhydrous sodium sulphate.

The anhydrous sodium sulphate may be readily formed into block or slab form with or without modifiers and additives such as those referred to above. Preferably, this is accomplished by mixing powdered sodium sulphate with five to ten percent of water and then pressing the resulting mixture into the form desired. When dried, the resulting formed mass may be heated to a temperature slightly above 500° F. and then cooled. In this way, a block or slab may be formed which can be handled easily and will not readily chip or break. The formed masses may also be produced in other ways, as disclosed in my aforesaid application.

While this invention has been described in connection with typical preferred practice, the invention may be practiced in other ways without departing from the scope thereof. Thus, while it is preferable to wrap material to be cooked in a substantially impervious container while cooking it, the container may be dispensed with and in such case the surface searing is so effective and the cooking is so rapid that the advantages of this invention in rapidity of cooking and prevention of shrinkage are very largely realized.

While the platens 10 and 10a have been shown as presenting flat surfaces, nevertheless the platens may be curved or have recesses therein so as to accommodate articles having special shapes. For example, a packaged plate containing both meat and vegetables may be provided with recesses for each of the food items and, when such a commercial product is to be repetitively cooked, the lower or upper platens or both, as the case may be, may be shaped to accommodate the shape of the container that is used.

While the device shown in the accompanying drawings comprises both upper and lower platens, each platen may be used separately so as to supply cooking heat to one side only of an article comprising material to be cooked.

In the device shown in the drawings, the electrical heating means for supplying heat to the masses 15 and 15a essentially comprising anhydrous sodium sulphate have been shown. However, other sources of heat may be employed. Thus, a gas flame may be used, and in such case it is preferable that the flame and products of combustion impinge upon a heating member such as a slab of stainless steel, clad copper or the like, the opposite surface of which is in contact with the mass essentially comprising anhydrous sodium sulphate and the heating member being on the side of the sulphate mass that is remote from the platen or sheet that presents the cooking surface and likewise is in contact with the mass.

Specific alternative modifications which further exemplify this invention and are illustrative of the practice thereof are shown diagrammatically in Figs. 3 to 6.

Figure 3:
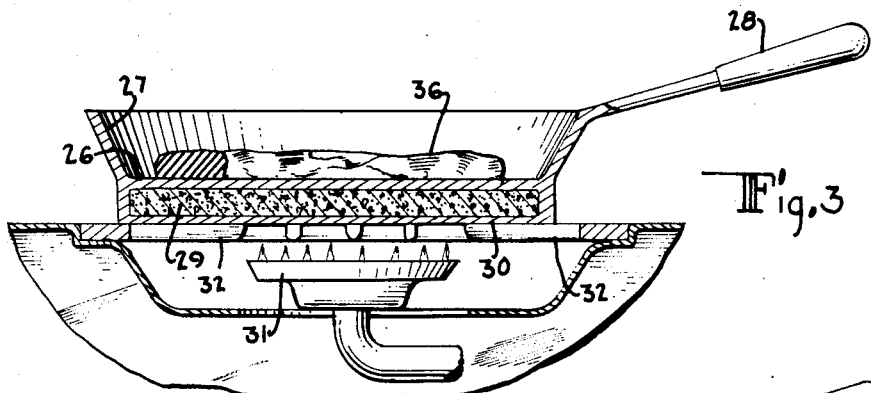
Figs. 3, 4, 5 and 6 are diagrammatic sectional elevations, respectively, of alternative embodiments of this invention.

In the modification of Fig. 3 the platen 26 presents a cooking surface for direct contact with an article or body 36 comprising material to be cooked, e.g. a slice of meat. The platen 26 may be of any desired shape such as round, oval or rectangular, and may have an upstanding flange 27 extending along the periphery thereof, its height depending upon the intended utility of the device for cooking. The platen 26 may be provided with a conventional handle 28. Immediately under the platen 26 in direct heat conductive relation therewith there is disposed the mass 29 essentially comprising anhydrous sodium sulphate, the mass 29 being roughly of the same lateral shape and extent as the platen 26. For protecting the mass 29 a sheet 30 of heat conductive material is employed which may be secured to the platen 26 along the margins thereof in any suitable way, as by welding, riveting or crimping. The mass 29 may be in either powdered form or in cake form such as a pressed slab. The platen 26 and the sheet 30 may be made of any suitable heat conductive material as, for example, stainless steel or aluminum. The parts described constitute a utensil which may be utilized as, for example, above the burner 31 of a conventional gas stove, the utensil resting upon the supporting brackets 32.

In using the device shown in Fig. 3 in the practice of this invention, one may place the utensil as a whole over a gas flame or other heat supplying means until the temperature has been brought to the conversion temperature of the mass 29 and until a substantial proportion, or all, of the anhydrous sodium sulphate has been converted to the hexagonal form with attendant absorption of heat energy. After thus having preheated the utensil an article of food 36, such as a piece of meat, may be placed on the platen 26 while it is at a temperature substantially below the conversion temperature of the anhydrous sodium sulphate in the mass 29. When the food to be cooked is placed upon the platen 26, the platen 26 is maintained substantially at the conversion temperature by reason of the extremely rapid rate of supply of heat energy from the mass 29 of anhydrous sodium sulphate, with the result that the food is cooked extremely rapidly, but because the platen 26 is below scorching temperature neither the food resting on the platen nor the surrounding platen area becomes charred. It is thus possible in the practice of this invetnion to cook food very rapidly so as to minimize shrinkage or loss of weight while at the same time preventing undesirable burning and scorching both of the food and the utensil on which it is cooked.

Figure 4:
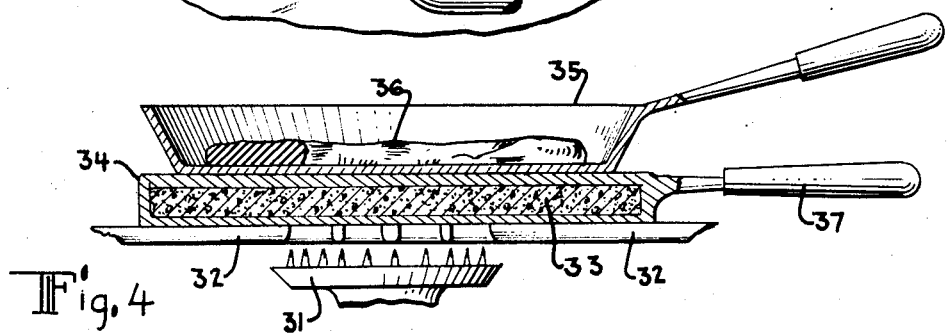

The practice of this invention is further exemplified in Fig. 4. In Fig. 4 a slab-like mass 33, essentially comprising anhydrous sodium sulphate, is encased in direct contact with a hollow casing 34 which may be made of any suitable heat conductive and heat resistive material such as stainless steel. The hollow casing 34 may be disc-shaped, oval or rectangular, as desired. In Fig. 4 the casing 34 has been shown resting on brackets 32 above a gas burner 31, and separable cooking utensil 35 is shown resting on the casing 34, the body 36 of food to be cooked being within the utensil 35. The use of the embodiment shown in Fig. 5 may be similar to that hereinabove described in connection with Fig. 4. However, the casing 34, which conveniently is provided with a handle 37, may be used in other ways. Thus the casing may be removed entirely from the flame after having been preheated to or above the conversion temperature of the anhydrous sodium sulphate and until all or part of the anhydrous sodium sulphate has been converted to the hexagonal form. Thereafter the casing may be used as a heating element after having been removed from heat exchange relation with the burner 31 either by placing a utensil containing a body of food or a body of food itself in contact with one or both of the surfaces thereof. Alternatively, the preheated device may be immersed in a body of food to be cooked or warmed, such as soup, so as to give up its heat. In any of these ways heat can be supplied extremely rapidly to food to be cooked without danger of scorching or charring.

Figure 5:
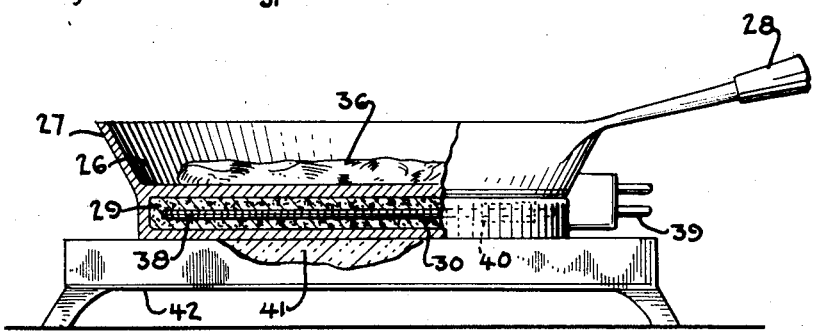

If desired, a utensil such as that shown in Fig. 3 may have heating means integrally embodied therein as shown in Fig. 5 wherein the elements of the utensil that are the same as shown in Fig. 3 have been indicated by like reference characters. However, in Fig. 5 the mass 29 essentially comprising anhydrous sodium sulphate has the electrically actuatable heating element 38 embedded therein which may be operatively connected to a source of electrical energy as by means of the plug members 39. A thermostat 40 preferably is employed so as to cut off automatically the supply of electrical energy to the heating element 38 when the temperature of the mass 29 reaches a predetermined upper limit above the conversion temperature of the mass 29. Inasmuch as the utensil shown in Fig. 5 comprises its own heat supplying means, the utensil when in use may be placed on a support such as a slab 41 of heat insulating material which may be supported by a suitable support frame 42. The utensil shown in Fig. 5 may be used as hereinabove described in connection with Fig. 3 with the attendant advantages mentioned hereinabove. It also may be mentioned, however, that by providing the heat insulation material 41 as a separate support member, the utensil is convenient to handle and may be very readily washed, the absence of charring or scorching also contributing to the ease with which the utensil may be cleaned.

Figure 6:
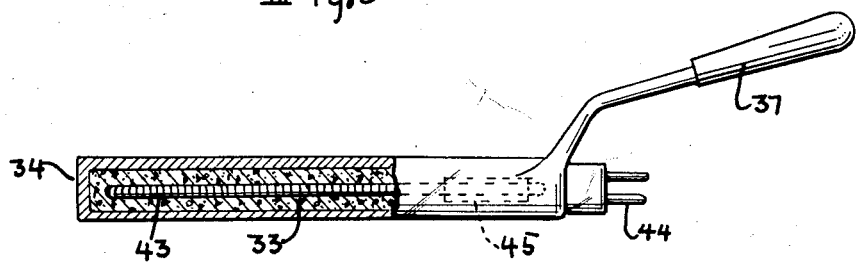

The utensil shown in Fig. 6 is similar to that shown in Fig. 4 and the corresponding elements thereof have been indicated by like reference characters. In Fig. 6, however, heat supplying means has been embodied therein, the heat supplying means being shown in the form of the electrical heating element 43 which is operatively connected to the plug members 44 through a thermostat 45 that controls the upper temperature limit above the conversion temperature of the mass 33 to which the utensil may be heated. A device such as that shown in Fig. 6, or in Fig. 4, when used as an immersion heater, could be cylindrical as well as flattened or slab-like in shape.

When reference is made to a member or body being in direct heat exchange or direct heat conductive relation with a mass essentially comprising anhydrous sodium sulphate, the member or body may be in direct contact with the mass or each may be in contact with intervening heat conductive material, as distinguished from the member or body being substantially separated from the mass by a poor conductor of heat such as an air space of substantial width. The term "heat conductive material" is used with reference to materials such as iron, steel, aluminum, metal having a glazed surface coating and the like which are suitable for use in cooking and in contradistinction to materials which are ordinarily classified as heat insulating materials because of their poor heat conductivity.

While the device and method of this invention are admirably suited for grills, skillets and the like intended for domestic use, this invention is of very great advantage in commercial operations involving the packaging of cooked foods, and its shipment to consumers. This invention lends itself to use with conventional packaging machinery inasmuch as, after the packaging has been completed, the packages may then be passed to a cooking device embodying this invention wherein only a short dwell is required for cooking the contents of the package and placing it in condition for shipment. While no special reheating means is required, nevertheless a device embodying this invention may also be employed for reheating the packaged cooked material and is well suited for use in restaurants, cafeterias, or automatic dispensers. For such reheating purposes, the reservoir of heat energy provided by one or more masses of anhydrous sodium sulphate is such that even packages of frozen food may be reheated directly without need for defrosting. It is to be understood that, while this invention is referred to herein as a cooking device and method of cooking, the practice thereof in reheating precooked food or the like is to be regarded as within the scope of this invention as thus referred to and defined herein and in the claims.

I claim:

1. A food cooking device comprising in combination a platen composed essentially of heat conductive material resistant to cooking temperatures and presenting a cooking surface for direct contact with the surface of an article comprising food to be cooked, a mass essentially comprising anhydrous sodium sulphate disposed in direct heat exchange relation with the opposite surface of said platen substantially throughout the area directly opposite to said cooking surface, and heating means for heating said mass to a temperature above that at which said sulphate undergoes conversion from a first to a second crystal form but below the melting point thereof.

2. A food cooking device according to claim 1 which comprises heat insulation material in heat insulating relation to the surface of said mass remote from said platen.

3. A food cooking device according to claim 1 which comprises means for discontinuing the supply of heat to said mass by said heating means responsive to attainment of a platen temperature above said conversion temperature.

4. A food cooking device comprising a pair of platens composed essentially of heat conductive material resistant to cooking temperatures each presenting a cooking surface for simultaneously directly contacting each side of a slab-shaped article comprising material to be cooked, a mass essentially comprising anhydrous sodium sulphate disposed in direct heat exchange relation with the opposite surface of each of said platens substantially throughout the area directly opposite to the cooking surface thereof, and means for heating each said mass to a temperature above that at which said sulphate undergoes conversion from a first to a second crystal form but below the melting point thereof.

5. A food cooking device comprising in combination sheet material composed essentially of heat conductive material resistant to cooking temperatures and presenting a cooking surface for direct contact with heat absorbing food to be heated to cooking temperature, a mass essentially comprising anhydrous sodium sulphate disposed in direct heat exchange relation with the opposite surface of said sheet material, and a heating member disposed on the side of said platen remote from said cooking surface in direct heat exchange relation with said mass.

6. A food cooking device comprising in combination a platen comprised essentially of heat conductive material resistant to cooking temperatures and presenting a cooking surface for direct contact with the surface of an article comprising food to be cooked confined in a closed, substantially vapor impermeable container having a flexible wall, a mass essentially comprising anhydrous sodium sulphate disposed in direct heat exchange relation with the opposite surface of said platen substantially throughout the area thereof directly opposite to said cooking surface, heat supplying means for heating said mass to a temperature above that at which said sulphate undergoes conversion from a first to a second crystal form but below the melting point thereof, and a member actuatable by outward movement of said flexible wall responsive to increase of pressure of vapor within said container.

7. A food cooking device comprising in combination sheet material composed essentially of heat conductive material resistant to cooking temperatures and presenting a surface for direct contact with heat absorbing material to be heated to cooking temperature and a mass essentially comprising anhydrous sodium sulphate maintained in direct heat exchange relation with the opposite surface of said sheet material, said device being adapted for heating said mass at least to a temperature at which said sulphate undergoes conversion from a first to a second crystal form.

8. A food cooking device comprising a mass essentially comprising anhydrous sodium sulphate and a casing therefor comprising heat conductive sheet material disposed on opposite surfaces of said mass in direct heat conductive relation therewith.

9. A food cooking device according to claim 8 wherein said casing is comprised in the bottom of a cooking receptacle.

10. A food cooking device according to claim 8 which comprises an electrically actuatable heating element within said casing in direct heat conductive relation to said mass.

11. A method of cooking food which comprises the steps of heating a mass essentially comprising anhydrous sodium sulphate to a temperature at least its conversion temperature at which it undergoes conversion from one crystal form to another but below the melting point thereof with absorption of heat at said conversion temperature in effecting substantial conversion of said sulphate, disposing a body comprising food to be cooked while said body is at a temperature below said conversion temperature in contact with a surface in heat exchange relation with said mass for receiving heat energy by direct conduction from said mass, and heating said body while in contact with said surface by heat supplied to said surface at least in part by reconversion of said sulphate at a temperature from about 350° F. to about 460° F.

12. A method of cooking food which comprises disposing material to be cooked in slab-shaped form encased in a closed, substantially impermeable container in contact on each side thereof with heat conductive sheet material comprised in the container wall of said container, heating a first mass and a second mass each essentially comprising anhydrous sodium sulphate to a temperature above that at which said sulphate undergoes conversion from a first to a second crystal form but below the melting point thereof, disposing said container with said material therein between said masses with each of said sides of said container in direct heat conductive relation with one of said masses, and heating said material to cooking temperature between about 350° F. and about 460° F. while said container is so disposed by heat supplied simultaneously from each of said masses by reconversion of said sulphate in each of said masses.

13. A method of cooking food which comprises the steps of confining moist material to be cooked in a closed, substantially impermeable container in contact with heat conductive sheet material comprised in the container wall, heating a mass essentially comprising anhydrous sodium sulphate to a temperature above the conversion temperature at which said sulphate undergoes conversion from a first to a second crystal form but below the melting point thereof, disposing said sheet material comprised in said container wall in contact with a surface in heat exchange relation with said mass for receiving heat energy by direct conduction from said mass, and heating said material to be cooked while said heat conductive sheet material is in contact with said surface by heat supplied to said surface at least in part by reconversion of said sulphate at a temperature from about 350° F. to about 460° F. until said material is cooked in the presence of steam produced within said container.

14. A method of cooking food which comprises the steps of heating a mass essentially comprising anhydrous sodium sulphate to a temperature above the conversion temperature at which the sulphate undergoes conversion from a first to a second crystal form but below the melting point thereof, disposing material to be cooked which at a temperature below said conversion temperature is in direct heat conductive relation with said mass, heating said material to cooking temperature while so disposed by heat supplied at least in part by reconversion of said sulphate at a temperature from about 350° F. to about 460° F. and supplying heat to said mass while said material remains so disposed in sufficient amount to effect institution of conversion of said sulphate prior to termination of the cooking period.

15. A method of cooking food which comprises the steps of heating a mass essentially comprising anhydrous sodium sulphate at least to the conversion temperature thereof but not above about 550° F. with absorption of heat at said conversion temperature in effecting substantial conversion of said sulphate, disposing material to be cooked while it is at a temperature substantially below said conversion temperature in direct heat conductive relation with said mass, and heating said material by heat supplied at least in part by reconversion of said sulphate at a temperature from about 350° F. to about 460° F., said mass remaining substantially at said reconversion temperature during the heating of said material substantially to cooking temperature.

16. A method of cooking food which comprises the steps of heating a mass essentially comprising anhydrous sodium sulphate to a temperature at least the conversion temperature at which it undergoes conversion from one crystal form to another but below the melting point thereof with absorption of heat at said conversion temperature in effecting substantial conversion of said sulphate, and supplying heat to material to be cooked while it is at a temperature below said conversion temperature by direct conduction from said mass, said heat being supplied at least in part by reconversion of said sulphate at a temperature from about 350° F. to about 460° F.

References Cited in the file of this patent

UNITED STATES PATENTS

| | | |
|---|---|---|
| 780,352 | Kafka | Jan. 17, 1905 |
| 1,887,618 | Bell | Nov. 15, 1932 |
| 2,677,664 | Telkes | May 4, 1954 |
| 2,808,494 | Telkes | Oct. 1, 1957 |